Aug. 20, 1968          J. S. BARNETT          3,397,859
ELECTROMECHANICAL TRANSDUCER AND VALVE OPERATED THEREBY
Filed June 14, 1965                        3 Sheets-Sheet 1
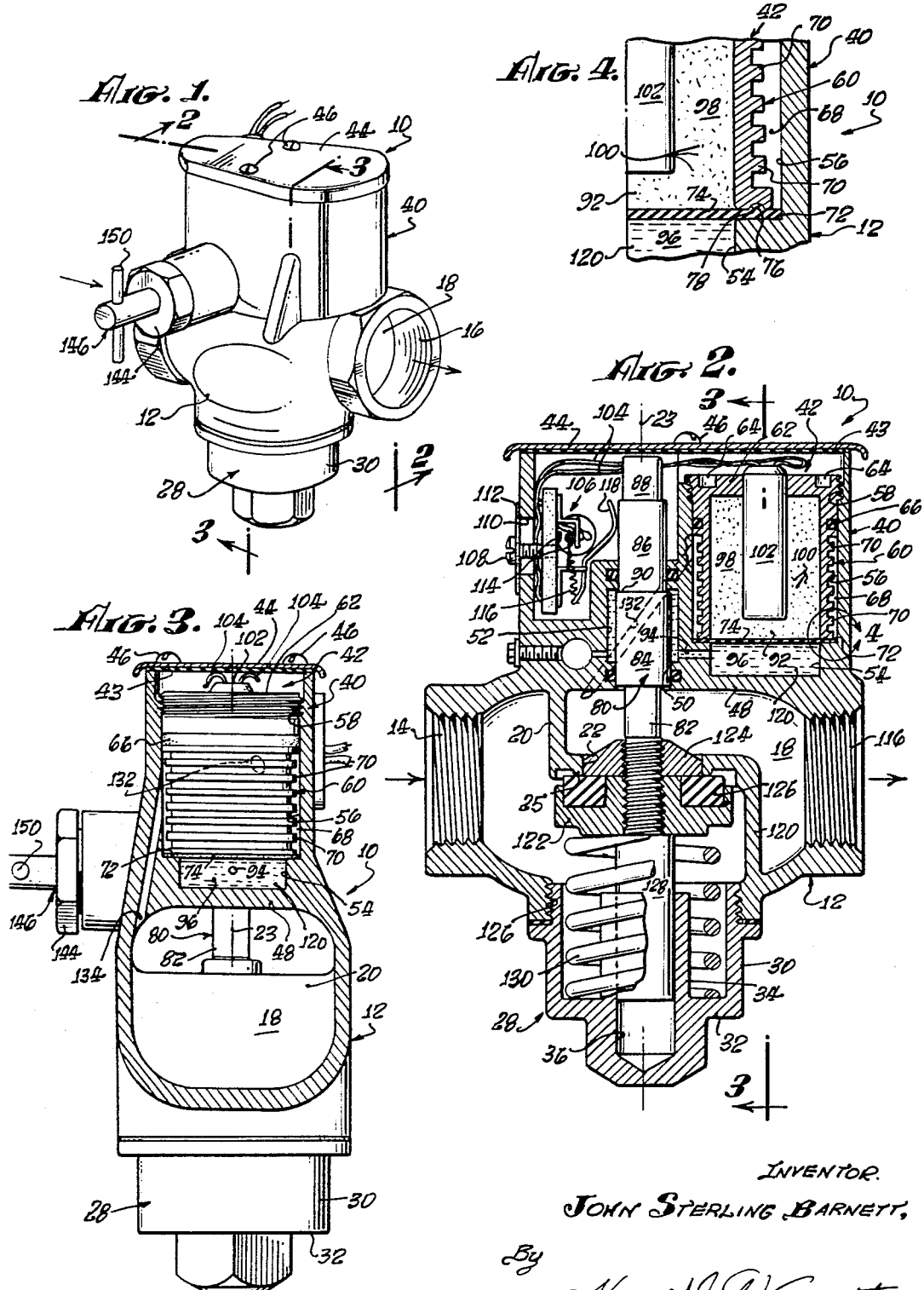
INVENTOR.
JOHN STERLING BARNETT,
By
Harold J. LeVisconte
ATTORNEY.

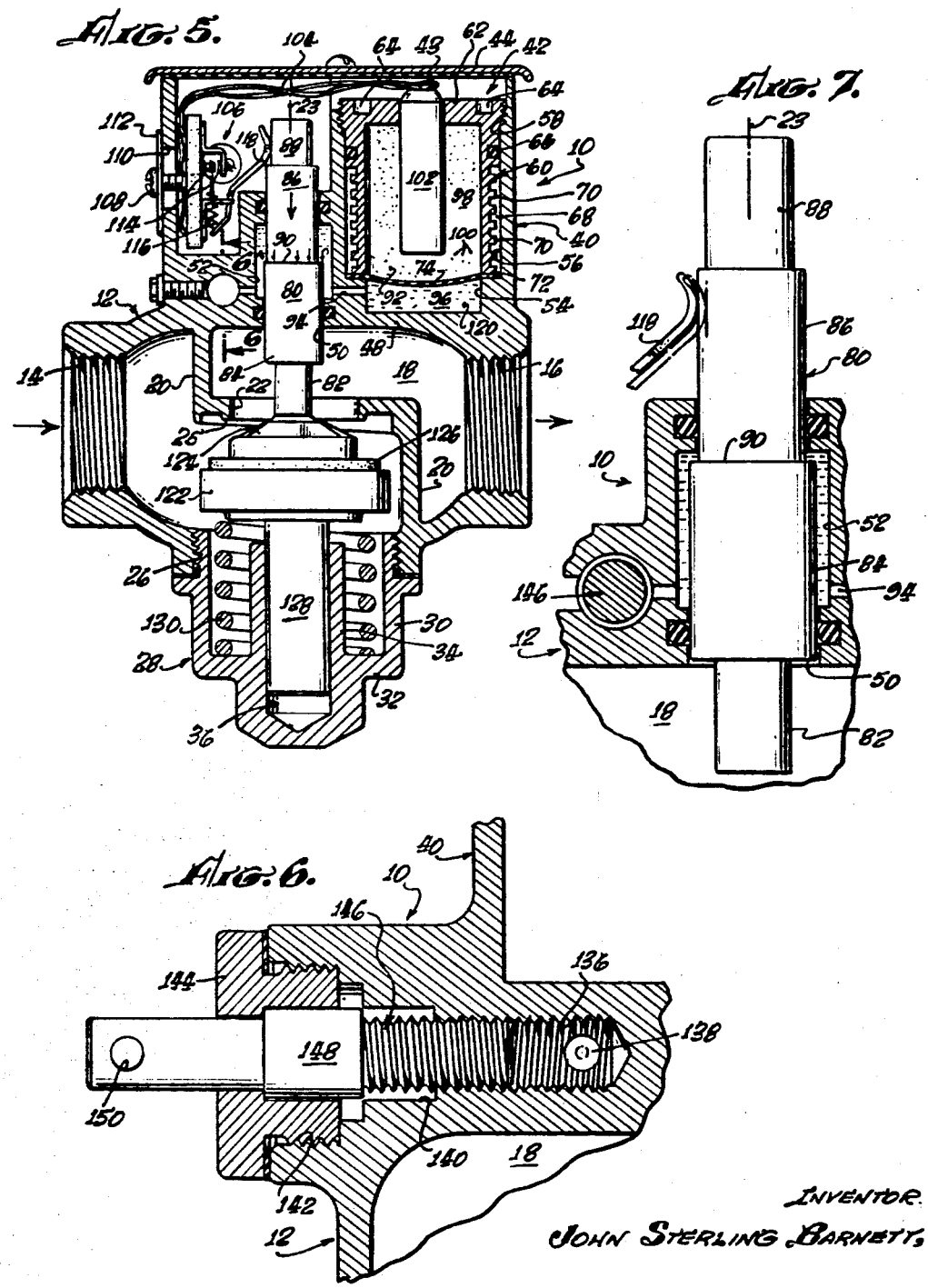

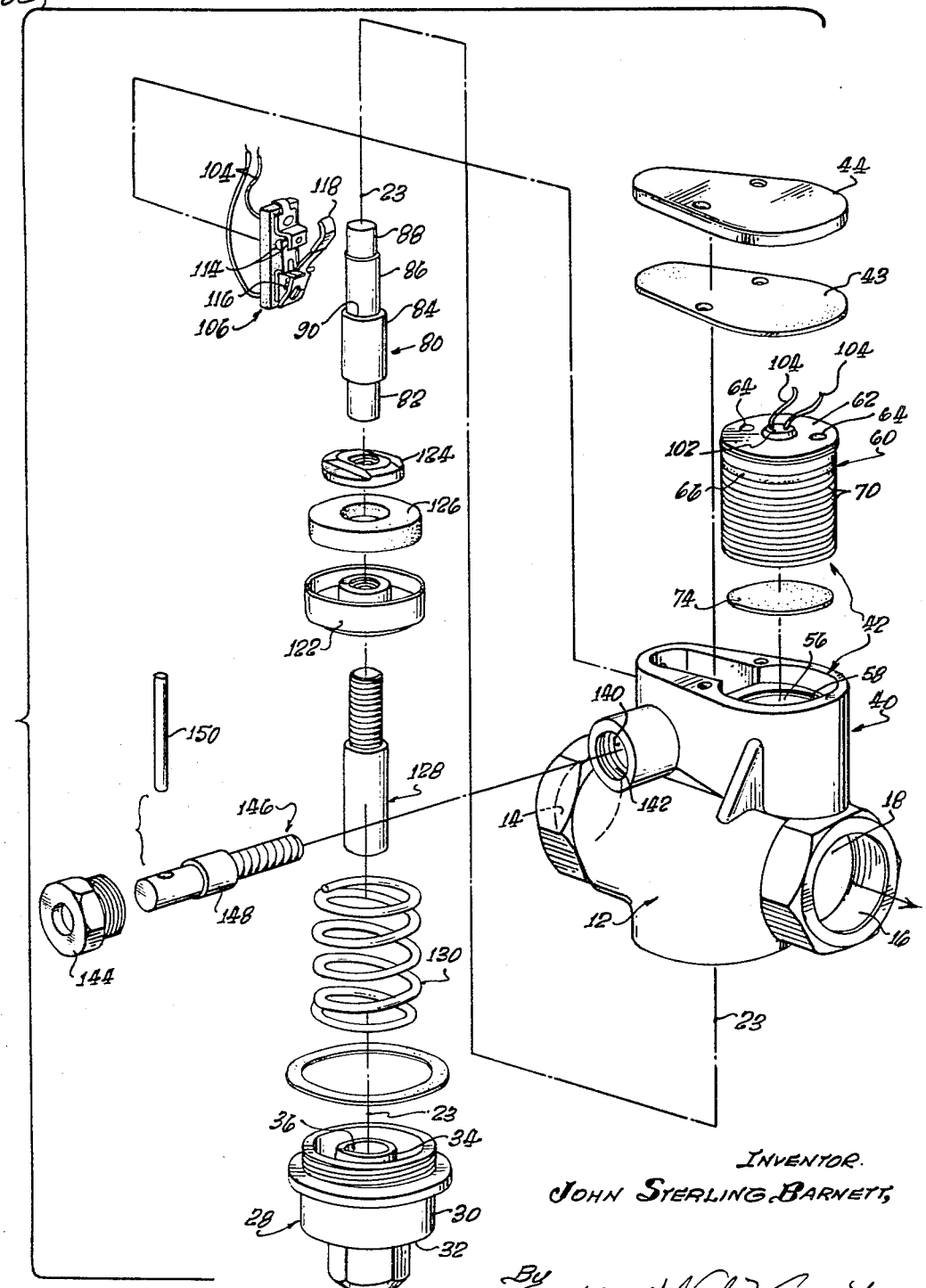

United States Patent Office 3,397,859
Patented Aug. 20, 1968

3,397,859
ELECTROMECHANICAL TRANSDUCER AND
VALVE OPERATED THEREBY
John Sterling Barnett, Sepulveda, Calif., assignor to Febco, Inc., Sun Valley, Calif., a corporation of California
Filed June 14, 1965, Ser. No. 468,183
6 Claims. (Cl. 251—11)

ABSTRACT OF THE DISCLOSURE

A valve adapted for remote control by an electric heater which causes a plastic mass having a high coefficient of thermal expansion to expand and to actuate a hydraulic means to open the valve against a spring bias which tends constantly to close it. As the valve tends to close, it opens a normally closed, spring biased switch disabling the heater and allowing the mass to cool and contract with resultant closing of the valve and concurrent closing of the switch. The intermittent supply of current to the heater maintains the valve substantially open with some slight fluctuation thereof with a minimum demand on the operating current and avoidance of overheating the expandable mass.

This invention relates generally to transducers and has more particular reference to a novel electromechanical transducer and to a remote control valve embodying the transducer.

Broadly stated, the invention provides an electromechanical transducer which is effective to translate, in a new and unique way, an electrical input signal into a mechanical output force or motion. As will appear from the ensuing description, the present transducer may be used for a variety of applications and may be employed in many different electromechanical devices. One particularly useful application of the invention, however, involves the remote control of flow through a fluid transmission system as, for example, water flow in an irrigation system. For this reason, the invention will be disclosed herein in connection with, but without limitation to, such an irrigation system.

A typical irrigation system embodies a number of irrigation heads, or sprinkler heads, and a number of valves for controlling water flow to the heads, either individually or in groups. In most cases, the valves are controlled automatically from a master control station which may be preset to operate any one or more selected valves at predetermined intervals.

The existing control valves for automatic irrigation systems of this type are either solenoid operated or water pressure operated. One type of solenoid valve comprises a small pilot valve operated by a solenoid which is energized from the master control station. This pilot valve, in turn, controls water flow to a power cylinder or the like, for operating the main valve. In another type of solenoid valve, the valve is opened directly by the valve solenoid. A typical water pressure operated valve has a main valve controlled by a power cylinder which is connected, through a small pilot tube, to a pilot valve at the master control station. The main valve is opened by supplying water under pressure to the valve through the pilot tube.

These existing valves for automatic irrigation systems are deficient in that they are quite complex in construction, require many precision machining operations in their fabrication, and, therefore, are costly to manufacture. Moreover, some solenoid valves require large operating current and thus present a problem of providing adequate insulation and protection for the valve leads. Accordingly, there is a need for an improved remote control valve for automatic irrigation systems.

The present invention makes possible the creation of an improved remote control valve through the provision of a unique electromechanical transducer means capable, among other uses, of being embodied in the valve and operative to convert an input current of low potential into a mechanical output force of a predetermined magnitude sufficient to effect opening of the valve and to hold the valve in open condition so long as the energizing current is supplied.

The primary objective of the present invention is to provide an electromechanical transducer means capable of translating an input electrical current into a substantially stationary and constant mechanical resistance to an opposing force.

A more specific object of the invention is to provide a transducer means of the character described in which the input electrical energy is converted into heat for effecting volumetric thermal expansion of a thermally expandable medium which expansion is a volumetric expansion and, through an interposed motion converting and multiplying means, converts the entire product of such volumetric expansion into linear movement of the output component of the transducer.

Another object of the invention is to provide a transducer means of the character described which is simple in construction, economical to manufacture, is effective for its intended purpose, and in which manual means may be employed optionally for actuation of the output component.

A further object of the invention is to provide a new and unique remote control valve embodying the transducer, wherein the electrothermally generated driving force on the output member of the transducer is utilized to effect operation of the valve between its open and closed positions.

With the foregoing objects in view, together with such additional objects and advantages as may subsequently appear, the invention resides in the parts, and in the construction, combination and arrangement of parts, described, by way of example, in the following specification of a presently preferred embodiment of the invention, reference being had to the accompanying drawings which form a part of said specification and in which drawings:

FIG. 1 is a perspective view of the present valve;

FIG. 2 is an enlarged section taken on line 2—2 in FIG. 1 and illustrating the valve in its closed position;

FIG. 3 is an enlarged section taken on line 3—3 in FIG. 1;

FIG. 4 is an enlargement of the area encircled by the arrow 4 in FIG. 2;

FIG. 5 is a section similar to FIG. 2 illustrating the valve in its open position;

FIG. 6 is an enlarged section taken on the line 6—6 in FIG. 5;

FIG. 7 is an enlarged fragmentary view of the upper end of the valve stem in FIG. 2; and FIG. 8 is an exploded perspective view of the valve.

In the following specification the use of such terms as "upper," "lower," etc. will be understood to have been employed only with respect to the attitude of the illustrated embodiment of the invention and that valves emboding the invention may be employed in any position in the use thereof.

The valve 10 illustrated in these drawings comprises a housing or body 12 having an inlet 14 and an outlet 16. The inlet and outlet are coaxially aligned and internally threaded, as shown, for connection in an external piping system. Extending between the inlet 14 and the outlet 16 is a fluid passage 18. Valve body 12 has an internal configuration similar to that of a conventional globe valve and includes an internal wall 20 which extends across the passage 18 and is formed with a port 22 communicating the passage upstream and downstream of the wall. Port 22 is disposed in an axial line designated as 23 in FIG. 8, said line intersecting the axial line of the valve inlet 14 and outlet 16 at right angles. On the upstream side of the wall 20, about the port 22, is an annular valve seat 25.

In the lower wall of the valve body 12, on the axial line 23 of the valve port 22, is a threaded opening 26. Threaded in this opening is a valve stem guide 28. Guide 28 has an outer cylindrical wall 30, a lower end wall 32, and an internal bearing sleeve 34 extending coaxially from the end wall 32 toward the valve seat 24. Extending through the bearing sleeve 34 and into the end wall 32 of the valve stem guide 28 is a bore 36.

The upper side of the valve body 12 is enlarged to form a housing 40 which contains the valve operating transducer 42 of the invention. Housing 40 has an open top closed by a removable cover 44 with an interposed gasket 43. Cover 44 may be secured in position in any convenient way, as by screws 46. The interior of the transducer housing 40 is separated from the fluid passage 18 and the valve body 12 by an upper wall 48 of the body. Extending through this wall into the fluid passage 18, and disposed on the axial line 23 of the valve port 22, is a cylinder 50. Cylinder 50 opens, at its upper end, into the interior of the transducer housing 40 and is radially enlarged, intermediate its ends, as indicated at 52.

The transducer 42 comprises a bore 54 which extends into the upper side of the valve body wall 48 on an axis parallel to and laterally offset from the axis 24 of the valve port 22. The upper end of the bore 54 is counterbored at 56 and internally threaded at 58. Counterbore 56 opens through the upper side of the transducer housing 40. Threaded in the counterbore 56 is a cup 60, the lower end of which is open and the upper end of which is closed by an upper end wall 62. The cup end wall 62 is provided with wrench receiving sockets 64 to facilitate threading of the cup 60 into the counterbore 56. The upper end of the cup 60 is sealed to the wall of the counterbore 56 by an O-ring 66. The lower end portion of the cup 60 is radially spaced from the wall of the counterbore 56 to define an annular space 68 about the cup. The lower end portion of the cup is also externally circumferentially grooved to define on the cup a multiplicity of circumferentially extending, axially spaced ribs 70.

Seating against the annular, upwardly presented shoulder 72 which is defined at the juncture of the bore 54 and counterbore 56, is a flexible diaphragm 74. This diaphragm may be constructed of neoprene or other comparable material. The peripheral edge portion of the diaphragm 74 is tightly clamped between the shoulder 72 and the lower end of the cup 60. As will appear from the later description of the operation of the transducer 42, the diaphragm 74 is subjected to axial forces which flex the diaphragm and thereby tend to draw its edge radially inward from between the shoulder 72 and the lower end of the cup 60, and to radial forces which tend to resist this inward movement of its edge. These latter forces, together with the frictional forces between the diaphragm, the shoulder 72, and the lower end face of the cup 60, may be sufficient to retain the edge of the diaphragm in position between the shoulder and the cup. Preferably, however, more positive retention of the edge of the diaphragm between the shoulder and cup is afforded by providing the upper surface of the diaphragm with an annular bead 76 and the lower end face of the cup with an annular groove 78 to receive the bead, as shown in FIG. 4.

The output member of the valve transducer 42 comprises a piston 80 which is stepped in diameter to form a lower stem 82, a central, main piston body 84, an upper piston extension 86, and an upper piston extremity 88. The main piston body 84 is slidable in the lower end of the cylinder 50. The upper piston extension 86 is slidable in the upper end of the cylinder 50. The piston is sealed to the wall of the cylinder by the O-rings illustrated. The piston body 84 and the upper piston extension 86 define therebetween an annular, upwardly presented piston face 90 which is exposed to the interior of the central, radially enlarged cylinder portion 52.

Cup 60 and diaphragm 74 define a first chamber 92 which is exposed to the upper surface of the diaphragm. The central, radially enlarged portion 52 of the cylinder 50 communicates, via a passage 94, with the bore 54 below the diaphragm 74. Cylinder 50 and bore 54, thereby, form a second chamber 96 one wall of which is formed by the under surface of the diaphragm 74.

The transducer chamber 92 is filled with a medium 98 having a high coefficient of thermal expansion. Among the media suitable for use in the transducer 42 are paraffin, tar, beeswax and other comparable materials. These materials, of course, congeal or solidify at normal room temperature and melt when heated. For reasons which will be explained presently, medium 98 preferably contains, in suspension, a quantity of metallic particles 100.

Embedded in the thermally expandable medium 98 is an electrical heating element 102. The upper end of this element extends through and is sealed to the upper end wall 62 of the cup 60. The electrical leads 104 for the heater 102 extend from the upper end on the heater, as shown.

Located within the transducer housing 40 is a switch 106. This switch is mounted on the side wall of the transducer housing 40, for adjustment in a direction parallel to the axial line 23, by means of a screw 108 which extends through a slot 110 in the wall and a cover strip 112 which overlies the slot. Switch 106 includes a set of contacts 114 which are connected in series in one of the heater leads 104. As shown in FIG. 1, these leads extend to the exterior of the transducer housing 40 for connection to an external voltage source for energizing the heater 102. Also included in the switch 106 is a spring 116 which is operatively connected at one end to the movable contact 114 and at its opposite end to one end of a pivoted switch operating arm 118. The opposite end of the switch arm 118 bears against the piston 80. Spring 116 is effective to normally urge the switch contacts 114 toward their normally open positions and to urge the switch arm 118 against the piston 80.

Piston 80 is movable in the cylinder 50 between its upper position illustrated in FIG. 2 and its lower position illustrated in FIG. 5. In the ensuing description, the upper position of the piston 80, shown in FIG. 2, is referred to as its normal position. The lower position of the piston, shown in FIG. 5, is referred to as its limiting position. Switch 106 is so adjusted and constructed that when the piston 80 occupies its upper normal position, the switch arm 118 bears against the larger diameter, upper piston extension 86 and the switch contacts 114 are held closed against the action of the switch spring 116. When the piston 80 occupies its lower limiting position, the switch arm 118 bears against the smaller diameter upper piston extremity 88 and the switch contacts 114 are returned to their normal open position by the switch spring 116.

At this point, therefore, it is apparent that when the piston 80 occupies its upper normal position of FIG. 2, the switch 106 is closed and the transducer heater 102 is conditioned to be energized through its leads 104. Movement of the piston 80 from its normal position to its lower limiting position of FIG. 5 permits the spring 116 to effect opening of the switch contacts 114, thereby interrupting the energizing circuit for the heater 102.

As noted earlier, the medium 98 contained within the transducer chamber 92, above the diaphragm 74, has a high coefficient of thermal expansion. Accordingly, when the heater 102 is energized, this medium expands and since the diaphragm constitutes the only wall of the chamber capable of accommodating the expansion, it is deflected downwardly with corresponding deflection of the diaphragm, as illustrated in FIG. 5. The various materials, referred to earlier, which may be employed for the thermally expandable medium 98 are preferred for use in the illustrated transducer 42 for the reason that these materials commence substantial thermal expansion at a temperature only slightly in excess of normal ambient temperature. The materials referred to, for example, commence substantial thermal expansion at a temperature on the order of 100° F. This relatively low temperature response of the mentioned materials is desirable since it provides the transducer 42 with immediate response to an electrical energizing signal delivered to the heater 102 through the heater leads 104.

Increase in volume within the transducer chamber 92, occasioned by thermal expansion of the thermally expandable medium 98 in response to energizing of the transducer heater 102 is transmitted to the piston face 90 and is effective to drive the piston 80 downwardly in the cylinder 50. To this end, the transducer chamber 96 below the diaphragm 74 is filled with a noncompressible liquid 120, such as water, silicone, oil, or other suitable liquid. It is now apparent, therefore, that downward deflection of the diaphragm 74 in response to thermal expansion of the medium 98 displaces the liquid 120 in the chamber 96 which, reacting, on the piston face 90, drives the piston 80 downwardly in its cylinder 50. It will be noted that the area of the piston face 90 is relatively small, wherefore, it is evident that the displacement of the liquid 120 by expansion induced deflection of the flexible pressure wall will result in a downward movement of the piston 80 and consequently of the valve component associated therewith to a much greater longitudinal or linear extent than the extent of displacement of the flexible pressure wall longitudinally of its chamber. In other words, the hydraulic connection between the flexible pressure wall and the piston serves not only as a motion transmitting means but also as a motion multiplying means. Moreover, it will be evident that varying the relative diameters producing the piston face 90, will vary the linear extent of piston movement per cubic unit of increase or decrease in the volume of the thermally expandable medium 98.

As will be explained presently, the piston 80 is returned to its normal position by spring pressure when the heater 102 is de-energized. It will be recalled that movement of the piston 80 from its normal position to its limiting position effects opening of the transducer switch 106. Accordingly, when the piston is driven from its normal position in response to thermal expansion of the thermal expandable medium 98, in the manner just explained, the transducer heater 102 is deenergized, thereby permitting the medium 98 to cool and contract. The spring pressure on the piston 80 then commences return of the piston to its normal position. Such spring return of the piston pressurizes the liquid 120 below the diaphragm 74, thereby urging the diaphragm upwardly from its deflected position of FIG. 5 to its normal undeflected position of FIG. 1. This liquid pressure on the under side of the diaphragm assists and accelerates contraction of the thermally expandable medium 98 to its initial volume following de-energizing of the heater 102. It is apparent, of course, that fluid pressure in the passage 18 tends to return the piston 80 to its normal position during such contraction of the medium 98. However, it has been found in actual practice that an additional spring return force on the piston is desirable or necessary to effect contraction of the medium 98 to its initial volume.

From the preceding description, it is evident that if the heater leads 104 are connected to an external voltage source, the piston 80 will cycle; that is to say, the piston will oscillate back and forth. The rate of this cycling action, however, is relatively slow owing to the thermal lag in the transducer system and to the restricted size of the communicating passage 94 between the cylinder 50 and the bore 54 below the diaphragm 74. The amplitude of the cycling may be minimized by appropriate positioning of the switch 106.

The lower piston stem 82 is externally threaded to receive a valve disc 122 and a jam nut 124. Valve disc 122 mounts a resilient washer 126 which is engageable with the valve seat 25, to close the valve 10, when the transducer piston 80 occupies its normal position of FIG. 2. The jam nut 124 is proportioned to fit in the valve port 22 in this closed position of the valve. Downward movement of the piston from its normal position of FIG. 2 to its limiting position of FIG. 5 retracts the valve disc 122 from the valve seat 25 and the jam nut 124 from the valve port 22, thereby opening the valve. Threaded on the lower end of the piston stem 82 is a cylindrical rod 128 which slides in the bore 36 in the valve guide 28 to guide the valve disc 122 in its movement between its open and closed positions.

Surrounding the inner bearing sleeve 34 of the valve guide 28 is a compression coil spring 130. This spring acts between the lower end wall 32 of the valve guide and the valve disc 122 to resiliently urge the disc to its closed position and the transducer 80 to its normal position.

At this point, it is apparent that under normal operating conditions, with the heater 102 de-energized, the valve disc 122 is retained in its closed position of seating engagement with the valve seat 25 by the valve spring 130 and fluid pressure in the valve, upstream of the valve seat. At this time, the heater switch 106 is closed. When the heater 102 is energized by connecting the heater leads 104 to an external voltage source, the thermally expandable medium 98 expands, thereby creating hydraulic pressure on the piston 80 which drives the piston downwardly to open the valve against the action of the valve spring 130 and fluid pressure in the valve. Opening of the valve to an extent determined by the adjusted position of the switch 106 de-energizes the heater 102. Thereupon, the valve commences to reclose under the action of the valve spring and fluid pressure. The switch 106 then recloses to re-energize the heater and reopen the valve. Thus, the valve tends to cycle. However, as noted earlier, the rate of this cycling is relatively slow. Also, the switch 106 is preferably so adjusted that it recloses well before the valve is completely closed. Accordingly, cycling of the valve produces no excessive pressure fluctuations in the fluid flowing through the valve.

The primary function of the switch 106 is to prevent overheating of the thermal medium 98 and the creation of excessive pressure in the transducer chamber 92. If the valve is designed to contain the pressure created by continuous heating of the medium 98, and the medium itself is capable of being continuously heated without adverse effects, or the rate of heat generation by the heater 102 and the rate of heat loss from the medium 98 are such as to maintain the temperature of the medium, and the pressure in the transducer chamber 92, at acceptable levels, the switch may be dispensed with.

It is evident, of course, that relatively rapid response of the valve, i.e., relatively rapid opening of the valve in response to energizing of the heater 102 from an external control station and relatively rapid closing of the valve in response to de-energizing of the heater from the control station, is desirable. The metallic particles in the medium 98 rapidly conduct heat throughout the mass of the medium when the heater 102 is energized and equally rapidly conduct heat from the interior of the medium to the wall surface of the transducer when the heater is de-energized. Thus these metallic particles contained in the thermal medium 98 tend to provide the valve with such relatively rapid response. If desired, closing of the valve may be further accelerated by externally cooling the thermal medium 98. To this end, the illustrated valve is provided with passages 132 and 134 which communicate the annular space 68 about the transducer cup 60 to the valve passage 18, downstream of the valve seat 25. Passages 132 and 134 are located in such a manner that a slight pressure differential exists between the ends of these passages which open into the main valve passage 18. A portion of the fluid flowing through the valve thus circulates through the flow space 68 to absorb the heat of the thermal medium 98 and thereby cause relatively rapid closure when the heater 102 is de-energized from the external control station. This circulation of fluid, of course, also tends to limit the temperature of the thermal medium 98 when the heater is energized. The circumferential ribs 70 on the transducer cup 60 provide the latter with maximum external heat transfer surface area.

It is often desirable or necessary to open a remote control valve manually, directly at the valve itself. To this end, the body 12 of the illustrated valve is equipped with a threaded bore 136 which communicates with the transducer chamber 96 through a passage 138. The outer end of the bore 136 is counterbored at 140 and is further counterbored and capped at 142 to receive a cap 144. Threaded in the bore 136 is a shaft 146 having a plunger 148 slidable in the counterbore 140 and an externally accessible handle 150 about which the shaft may be rotated. Normally the shaft 146 is retracted outwardly, as shown in FIG. 6. When it is desired to open the valve manually, the shaft 146 is threaded inwardly to advance the shaft plunger 148 forwardly in the counterbore 140. This pressurizes the liquid 120 in the transducer chamber 96 to open the valve. Manual reclosing of the valve is accomplished by returning the shaft 146 to its outer retracted position of FIG. 6.

It is now apparent that the transducer 42 of the invention is uniquely adapted for operating a valve of the type illustrated in the drawings. In this connection, it is significant to note that an important advantage of the invention resides in the fact that a minimum number of precision machining operations are required in the construction of the valve. Another advantage of the invention resides in the fact that only a relatively low current is required for operating the valve. As a result, the valve presents no problem of providing adequate insulation for the heater leads 104. As noted earlier, however, and as is now evident, the transducer 42 is not limited in application to valves.

While the invention has herein been shown and described in what is presently conceived to be its most practical and preferred embodiment, it is recognized that departures may be made therefrom within the scope of the invention which is not to be limited to the details disclosed herein but is to be accorded the full scope of the claims so as to embrace any and all equivalent devices, it being obvious that the electromechanical transducer means is capable of operating devices other than a valve or other than the specific valve means with which it has been shown.

I claim:

1. An electromechanical transducer comprising:
a housing having a chamber,
a movable pressure wall within and sealed to the wall of said chamber to define a sealed chamber space,
a thermally expandable medium filling said chamber space,
said medium having a relatively high coefficient of thermal expansion and being effective when heated to drive said pressure wall in one direction in said chamber,
an electrical heater disposed in heat transfer relation to said medium for heating said medium,
means for urging said pressure wall in the opposite direction in said chamber, and
means for recirculating a coolant in heat transfer relation to said medium for cooling said medium when said heater is de-energized.

2. An electromechanical transducer for converting electrical energy into mechanical energy, comprising:
a housing having sealed chamber means,
a movable pressure wall within and sealed to the wall of said chamber means,
means in said chamber means for exerting pressure on one side of said pressure wall to drive the latter in one direction in said chamber, including a liquid in one portion of said chamber means disposed in pressure transmitting relation to said pressure wall,
a thermally expandable medium in another portion of said chamber means disposed in pressure transmitting relation to said liquid, said medium having a relatively high coefficient of thermal expansion and being effective when heated to distend said pressure wall, thereby to drive said pressure wall in said one direction, and an electrical heater disposed in heat transfer relation to said medium for heating said medium,
means for urging said pressure wall in the opposite direction, and
means for recirculating a coolant in heat transfer relation to said medium for cooling said medium when said heater is de-energized.

3. An electromechanical transducer for converting electrical energy into mechanical energy, comprising:
a housing having sealed chamber means,
a movable pressure wall within and sealed to the wall of said chamber means,
means in said chamber means for exerting pressure on one side of said pressure wall to drive the latter in one direction in said chamber, including a liquid in one portion of said chamber means disposed in pressure transmitting relation to said pressure wall,
a thermally expandable medium in another portion of said chamber means disposed in pressure transmitting relation to said liquid, said medium having a relatively high coefficient of thermal expansion and being effective when heated to distend said pressure wall, thereby to drive said pressure wall in said one direction, and an electrical heater disposed in heat transfer relation to said medium for heating said medium,
means for urging said pressure wall in the opposite direction, and
a second movable pressure wall within and sealed to the wall of said chamber means, said pressure walls defining therebetween a first chamber space containing said liquid, and said second pressure wall and housing defining therebetween a second chamber space containing said medium, and
means for recirculating a coolant in heat transfer relation to said second chamber space for cooling said medium.

4. An electromechanical transducer for converting an electrical energy input into an output of positive, linear, mechanical movement and comprising;
a housing having a sealed chamber,
a flexible pressure wall sealed to the wall of said chamber and dividing the interior of said chamber into an actuating portion and an actuated portion,
a thermally expandable medium filling said actuating portion of said chamber,
a linearly movable motion output element mounted for reciprocation on said housing,
means for heating said medium with consequent volumetric thermal expansion thereof and resultant distension of said flexible wall,
a closed hydraulic circuit extending between the face of flexible wall in said actuated portion of said chamber and a cylinder in which a piston connected to said output element is reciprocable and so disposed that the displacement of the liquid component of said hydraulic circuit deriving from distension of said flexible wall will effect movement of said output element in one direction,
spring means constantly yieldingly operative to tend to urge said output element in the direction opposite to that caused by expansion of said medium, the area of said piston subjected to pressure by said displacement of liquid being such that the extent of linear movement of piston will be greater than the extent of bodily movement of said pressure wall by reason of said thermal expansion of said medium, and manually operable means accessible externally of said housing for optionally displacing said liquid to drive said piston in said one direction.

5. A transducer according to claim 4 in which:

said manually operable means comprises a screw threaded plunger engaging an internally screw threaded cylinder having connection with said hydraulic circuit.

6. A valve comprsing:

a valve body having a fluid passage therethrough, a valve seat about said passage, and a chamber opening to said passage, a pressure wall within and sealed to the wall of said chamber, and dividing said chamber into an actuating portion and an actuated portion, means filling said actuating portion of said chamber for exerting a force on said pressure wall to distend said pressure wall in one direction in said chamber comprising a thermally expandable medium having a relatively high coefficient of thermal expansion disposed in pressure transmitting relation to said pressure wall for imposing a force distending said pressure wall to a predetermined limiting position in response to heating of said medium, and an electrical heater disposed in heat transfer relation to said medium for heating said medium, spring means yieldingly operative to urge movement of said distended pressure wall from said limiting position to a given normal position, a valve member mounted on said housing for movement between a closed position of seating engagement with said valve seat and an open position spaced from said valve seat in response to movement of said pressure wall between said normal and limiting positions, respectively, and a motion transmitting means extending between said pressure wall and said valve member operative to translate volumetric increase of said medium when heated, into linear movement of said valve member away from said seat, said motion transmitting means including devices carried by and operable externally of said valve body to effect movement of said valve member between said open and closed positions independently of movement thereof by said heater.

References Cited

UNITED STATES PATENTS

| | | | |
|---|---|---|---|
| 1,853,504 | 4/1932 | Butler | 251—57 X |
| 2,835,634 | 5/1958 | Vernet et al. | 60—23 X |
| 3,140,852 | 7/1964 | Herzog | 251—11 |
| 3,164,365 | 1/1965 | White et al. | 251—11 X |
| 3,256,686 | 6/1966 | Linberg | 60—23 X |
| 3,263,411 | 8/1966 | Carlson | 60—23 |
| 3,266,235 | 8/1966 | Carlson | 60—23 |

M. CARY NELSON, *Primary Examiner.*

J. R. DWELLE, *Assistant Examiner.*